United States Patent
Alkafafi et al.

(10) Patent No.: US 11,868,115 B2
(45) Date of Patent: Jan. 9, 2024

(54) OPERATING AN AT LEAST TWO-AXLE MACHINE TOOL

(71) Applicant: Siemens Aktiengesellschaft, Munich (DE)

(72) Inventors: Loay Alkafafi, Erlangen (DE); Tobias Kreilos, Magstadt (DE); Ralf Spielmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/020,871

(22) PCT Filed: Jul. 7, 2021

(86) PCT No.: PCT/EP2021/068858
§ 371 (c)(1),
(2) Date: Feb. 10, 2023

(87) PCT Pub. No.: WO2022/033777
PCT Pub. Date: Feb. 17, 2022

(65) Prior Publication Data
US 2023/0244213 A1    Aug. 3, 2023

(30) Foreign Application Priority Data
Aug. 13, 2020 (EP) .................................... 20190965

(51) Int. Cl.
*G05B 19/416* (2006.01)
(52) U.S. Cl.
CPC .. *G05B 19/416* (2013.01); *G05B 2219/43065* (2013.01); *G05B 2219/43203* (2013.01)

(58) Field of Classification Search
USPC ........................................ 700/187, 188, 193
See application file for complete search history.

(56) References Cited

U.S. PATENT DOCUMENTS

2021/0356938 A1    11/2021    Schneider

FOREIGN PATENT DOCUMENTS

| | | |
|---|---|---|
| DE | 10 2006 030 177 A1 | 1/2008 |
| EP | 3 623 887 A1 | 3/2020 |
| WO | WO 2008/125656 A1 | 10/2008 |

OTHER PUBLICATIONS

PCT International Search Report and Written Opinion of International Searching Authority dated Nov. 25, 2021 corresponding to PCT International Application No. PCT/EP2021/068858 filed Jul. 7, 2021.

*Primary Examiner* — Sean Shechtman
(74) *Attorney, Agent, or Firm* — Henry M. Feiereisen LLC

(57) ABSTRACT

In a method for operating an at least two-axle machine tool, a geometric description of a path is specified, and according to the path, an advancing movement is carried out by simultaneously moving at least in one section a first axle and a second axle. A first maximum value for a first kinematic parameter relating to the advancing movement along the section of the path is defined by a control unit based on the geometric description. The advancing movement along the section is planned by the control unit by taking the first maximum value into consideration, and the axles are actuated so as to carry out the advancing movement according to the planned movement.

12 Claims, 1 Drawing Sheet

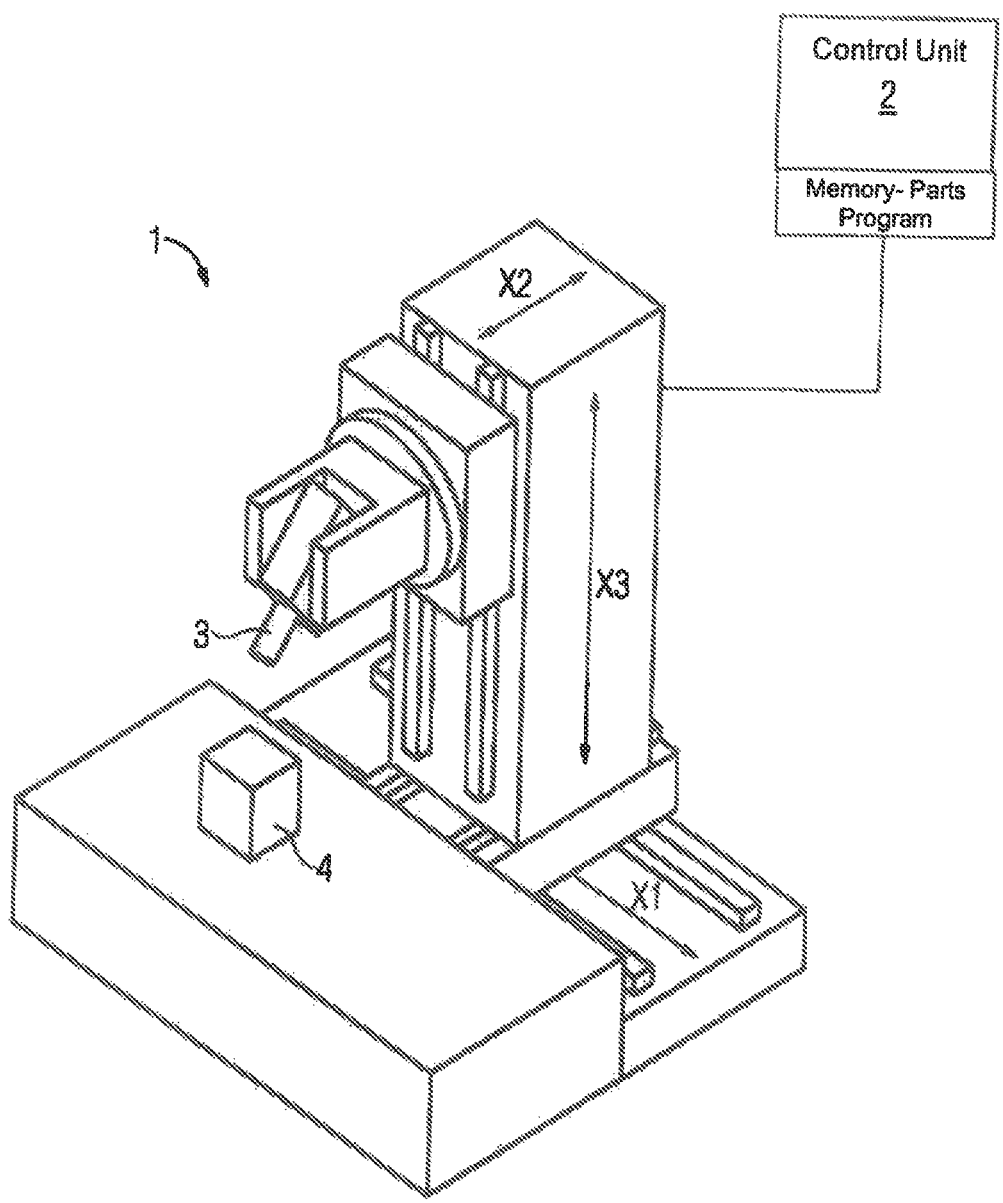

OPERATING AN AT LEAST TWO-AXLE MACHINE TOOL

CROSS-REFERENCES TO RELATED APPLICATIONS

This application is the U.S. National Stage of International Application No. PCT/EP2021/068858, filed Jul. 7, 2021, which designated the United States and has been published as International Publication No. WO 2022/033777 A1 and which claims the priority of European Patent Application, Serial No. 20190965.2, filed Aug. 13, 2020, pursuant to 35 U.S.C. 119(a)-(d).

BACKGROUND OF THE INVENTION

The present invention relates to a method for operating an at least two-axis machine tool, wherein a geometric description of a path is specified and according to the path an advancing movement is carried out by moving a first axis and a second axis of the machine tool simultaneously, at least in one section. The invention further relates to a control system for an at least two-axis machine tool, to a machine tool, to a computer program product and also to a computer-readable storage medium.

Known machine tools are designed, built and supplied as so-called universal machines. This means that ail common control functions are put into operation, so that said functions are available for universal use. Under what conditions and for what purposes the machine tool is actually employed, for example which parts are manufactured by it and how the machine tool is loaded, is not taken into account in the structure of its controller. Accordingly the parameterization of the controller of the machine tool, for example in respect of settings of the axis dynamics, is earned so that it is possible to use the machine tool in as stable and robust a way as possible.

Known from WO 2008/125556 A1 are a method and a facility for guiding the movement of a movable machine element of a numerically controlled machine, wherein a movement path of the machine element is resolved into movement sections following on from one another, wherein, with the aid of predetermined restrictions of machine axes, a maximum path velocity, a maximum possible path acceleration and a maximum possible path jerk are given, wherein the local minima of the maximum possible path velocity are determined, wherein for each local minimum an associated left and right-side path velocity segment is determined, wherein the path velocity essentially runs through the lower level of the discontinuity jump points of the maximum possible path velocity and with a rising course of the maximum possible path velocity does not reach the lower level of the discontinuity jump points before the respective discontinuity jump points.

Known from DE 102006030177 A1 is a method for operation of a machine tool, in which a tool of the machine tool is able to be moved in a movement range along path curves able to be described in a path coordinate system, wherein the path curves are able to be described by means of a parameterized curve dependent on a time-dependent curve parameter function and wherein the curve parameter function is able to be represented as at least a quadratic polynomial.

Known from EP 3623887 A1 Is a machine that has a number of position-controlled axes, which in their totality bring about a travelling movement of two elements of the machine relative to one another. A control facility controls the axes of the machine in such a way that, relative to one another, the elements travel sequentially one after the other over path sections with velocity curves defined for the path sections and thereby defined acceleration curves. The path sections each have a beginning and an end, wherein the end and the beginning distinguish between path sections following on directly from one another in the position of at least one axis. The control facility establishes for the axes a constant time-optimized movement guidance constant in location (x), velocity (v), acceleration (a) and acceleration (a) and restricted in velocity (v), acceleration (a) and jerk (r), from the end of the one to the beginning of the next path section. The guidance is established in such a way that the movement of the elements relative to one another at the end of the one path section constant in location (x), velocity (v) and acceleration (a) transitions into the established movement guidance and the movement guidance at the beginning of the other path section transitions constant in location (x), velocity (v) and acceleration (a) into the other path section.

The robust parametrization of the controller enables a universal machine tool to produce many different workpieces in a more or less acceptable processing time. However such a robust parameterization has the disadvantage that compromises must always be made. Thus for different workpieces different requirements in respect of the required dimensional accuracy, processing time or surface quality and so forth are possible. The robust parameterization means however that with all these objectives compromises have to be made in order to ensure an overall universal usability. As a consequence this leads to losses in productivity in the form of longer processing times, to reduced surface quality and/or lower accuracy able to be achieved.

Against this background an object of the present invention is to specify an improved concept for operating an at least two-axis machine tool, through which the individual requirements for productivity and/or quality can be better taken into account.

SUMMARY OF THE INVENTION

This object is achieved by the respective subject matter of the independent claims. Advantageous developments and preferred forms of embodiment are the subject matter of the dependent and subordinate claims.

The improved concept is based on the idea of ascertaining the parameterization of the controller of a machine tool as dependent at least in part on the actual path specified as part of a parts program for example, in that at least one maximum value is ascertained for a kinematic parameter of the advancing movement depending on the geometric description of the path.

In accordance with the improved concept a method for operating an at least two-axis machine tool is specified, wherein a geometric description of a path is specified and an advancing movement in accordance with the path is carried out by simultaneous movement, at least in sections, of a first axis and a second axis of the machine tool. By means of a control unit of the machine tool a first maximum value for a first kinematic parameter concerning the advancing movement along a section of the path dependent on the geometric description is ascertained. The advancing movement along the section by means of the control unit is planned, taking into account the first maximum value, and the first axis and the second axis are activated by means of the control unit in order to carry out the advancing movement in accordance with the planned movement along the section.

The path is ascertained in this case by the geometric description, i.e. in particular by points in the n-dimensional parameter space and where necessary by interpolated sections between the points, wherein n corresponds to the total number of the axes. In the case of a machine tool with three linear axes n is equal to three for example, with an additional three axes of rotation n would be equal to six and so forth. In particular the path does not contain any specifications regarding an actual path velocity, an actual path acceleration, an actual path jerk and so forth. The path can however include restrictions for these values.

The path can involve a path for a tool of the machine tool or for a workpiece. The advancing movement corresponds in particular to a movement of the tool relative to the workpiece. The advancing movement can thus take place through a movement of the tool with the workpiece in a fixed location, through a movement of the workpiece with the tool in a fixed location or through a combination of the two options. The term in a fixed location can be understood in such a way in this case as no movement is taking place in a coordinate system permanently linked to the machine tool or a frame of the machine tool.

The geometric description of the path can for example be predetermined in the form of a parts program, in particular an NC parts program or a CNC parts program, in that the parts program is stored on a memory unit of the machine tool or of the control unit.

The first and the second axis can basically involve rotating or linear axes in each case. In preferred forms of embodiment the first and the second axis each involve a linear axis.

A kinematic parameter can in particular be understood as a single or multiple temporal derivation of the path location, i.e. a path velocity, a path acceleration, a path jerk and so forth. In particular a kinematic parameter as understood in this way is given by $d^n s/dt^n$, wherein n stands for a whole number greater than or equal to 1.

A maximum value for a first kinematic parameter can in particular be seen as a maximum value for an amount of the kinematic parameter. In order for example to ascertain the first maximum value dependent on the geometric description the control unit can in particular ascertain a local gradient or a local bend of the path and so forth in the section and ascertain the first maximum value as dependent thereon. The local gradient, bend and so forth in this case can be contained in the parts program or be computed by means of the control unit based on the geometric description.

The planning of the advancing movement along the section for example includes the ascertaining of all necessary kinematic axis parameters, i.e. axis velocity, axis acceleration, axis jerk and so forth, for each of the individual axes along the section, or ascertaining corresponding control parameters or current strengths for the corresponding axis drives of the machine tool. The planning of the advancing movement in this case in particular includes the ascertaining of one or more actual values for the first kinematic parameter, taking into account the first maximum value, i.e. in such a way that the first maximum value is not exceeded by the actual value of the first kinematic parameter along the section.

Unlike with universally parameterized machine tools or controllers for machine tools, in accordance with the improved concept the first maximum value is thus ascertained as being dependent on the actual path specified. The first maximum value and accordingly the first kinematic parameters can thereby be ascertained optimally and individually adapted for the path or for each section of the path.

This means that few or no compromises have to be made in the ascertaining of the first maximum value or of the first kinematic parameter that are at the expense of a desired production quality or throughflow velocity, but in the actual case do not offer any advantages.

If for example the focus lies on as short a throughput time as possible, then the first maximum value can be selected in a different way than if the focus lies on a maximum accuracy, for example on a minimum overshoot of an axis. The ascertaining of the first maximum value can be undertaken in this case differently for different sections of the path, so that an individually tailored path planning and thus an increase in productivity and/or quality of the workpiece produced or of a measurement of a workpiece carried out by means of the machine tool can be achieved.

It is pointed out that the first maximum value ascertained as described with the aid of the geometric description of the path cannot be fully utilized in every case, since restrictions can possibly be produced by further axes or further kinematic parameters. In such cases the planning of the advancing movement is however still carried out while taking into account the first maximum value, in the sense that the first maximum value may not be exceeded. In other words further maximum values, which are predetermined in another way or by other peripheral conditions can be produced for the first kinematic parameter. The planning of the advancing movement ensures in this case that the first kinematic parameter is always smaller than the smallest maximum value for the first kinematic parameter. The same also applies for the further kinematic parameters discussed below.

In various forms of embodiment of the method the method steps of ascertaining the first kinematic parameter and of planning the advancing movement can for example be undertaken offline, i.e. before the beginning of the operational use of the machine tool, in particular before the beginning of the advancing movement. The steps carried out offline can for example be carried by means of a first sub-processing unit of the control unit, while the actual activation of the axes can be carried out by means of a second sub-processing unit of the control unit. The sub-processing units can in this case in particular be designed independent of one another and/or spatially separated from one another and communicate with one another wirelessly or by wire, so that in particular the first sub-processing unit can transfer a result of the planning of the advancing movement to the second sub-processing unit.

In accordance with at least one form of embodiment a further first maximum value for the first kinematic parameter relating to the advancing movement along a further section of the path dependent on the geometric description is ascertained by means of the control unit. The advancing movement along the further section is planned by means of the control unit taking into account the first maximum value. The first axis and the second axis are activated by means of the control unit, in order to carry out the advancing movement in accordance with the planned movement along the further section.

The first maximum value relating to the section and the further first maximum value relating to the further section are generally different from one another in this case. Accordingly the planning of the advancing movement relating to the first kinematic parameter in the section can also differ from the planning for the further section. This also enables, within the framework of the production of an individual workpiece or the measuring of an individual workpiece, depending on the processed or measured area of the workpiece in each case, there to be individual attention given to the corresponding circumstances and requirements. In areas with a slight surface curvature of the workpiece for example a different ascertaining of the first kinematic parameter can be of advantage compared to an area of the same workpiece with a high local curvature.

In accordance with at least one form of embodiment the first maximum value is given by a maximum path velocity of the advancing movement.

The path velocity of the advancing movement is given in this case by $v_B = ds/dt$, wherein a corresponds to the location on the path. In this case s can be understood as a function of the individual axis coordinates of the at least two axes of the machine tool, so that in particular $s=s(x_1, x_2)$, wherein $x_1$ and $x_2$ represent the coordinates corresponding to the first or the second axis.

The first maximum value being given by the maximum path velocity can in particular be understood in such a way that the first maximum value is equal to the maximum path velocity or is equal to a function of the maximum path velocity and where necessary of path-dependent parameters. In this case it should be pointed out that the maximum path velocity can be seen here not as a function of the time but as a value, thus the function does not include any temporal derivative. In this case the maximum path velocity can be represented in different forms of embodiment as a function, for example as a polynomial function, of the path.

In accordance with the invention a second maximum value for a second kinematic parameter relating to the advancing movement along the section dependent on the geometrical description is ascertained by means of the control unit, for example offline. The planning of the advancing movement along the section is carried out while taking into account the second maximum value.

In accordance with at least one form of embodiment the second maximum value is given by a maximum path acceleration of the advancing movement. The path acceleration in this case corresponds in particular to $a_B = d^2s/dt^2$.

The first and the second kinematic parameters in this case are in particular not independent of one another. If the first kinematic parameter involves a function of the path velocity and the second kinematic parameter involves a function of the path acceleration, then in general these cannot be ascertained independently of one another. By taking into account both the first kinematic parameter and also the second kinematic parameter and the respective restriction with the aid of the first maximum values and the second maximum value there can thus be a consistent optimization of the path planning.

In accordance with the invention, in particular by means of the control unit, a range of values for the first maximum value is determined depending on a predetermined first kinematic limit value for the first axis. A range of values for the second maximum value is determined, in particular by means of the control unit, depending on the first kinematic limit value for the first axis. In order to ascertain the first maximum value and the second maximum value a division parameter dependent on the geometric description is ascertained by means of the control unit, through which both the first maximum value and also the second maximum value are uniquely defined within the respective range of values.

The first kinematic limit value for the first axis can in particular involve a maximum axis acceleration of the first axis. This is specified as a fixed value for the machine tool for example and cannot be changed as part of the parameterization of the controller.

From the movement equations for the axes a connection between the respective axis acceleration on the one hand and the path velocity and also the path acceleration on the other hand can be established. In particular the axis acceleration of one axis is given by a sum consisting of a centripetal proportion, that is proportional to the square of the path velocity, and a path acceleration part that is proportional to the path acceleration. Since the respective axis acceleration is limited by the first kinematic limit value, the limit values for the centripetal term and the path acceleration term must be divided up accordingly in order to parameterize the controller. The division parameter in this case to a certain extent ascertains which proportion of the available axis acceleration should be assigned to the centripetal term and which proportion is accordingly assigned to the path acceleration term. The division parameter can be seen as the effect of the curve on the path acceleration and is therefore referred to as the CEOPA (curve effect on path acceleration).

The choice of CEOPA therefore enables the available axis acceleration to be optimally divided up depending on the actual requirements, in that CEOPA is ascertained as being dependent on the geometric description and in particular is ascertained for each section of the path independently of one another.

It is pointed out that the actual path planning must take account of the restrictions of all axes. Accordingly, in corresponding forms of embodiment, the explanations with regard to the first axis can be transferred to all further axes of the machine tool. In particular a corresponding division with the aid of a division parameter can also be undertaken for the second axis and for each further axis of the machine tool. If for example the maximum axis accelerations of individual axes differ from one another, then it may be that not all ranges of values will be fully utilized, but the peripheral conditions of the remaining axes must be taken into account.

In accordance with at least one form of embodiment an optimization method is carried out by means of the control unit in order to ascertain the division parameter, wherein the division parameter is used as the optimization parameter.

Because of the possible interaction of the individual axes in respect of the permitted ranges of values, the optimization method can take hi this case account of corresponding peripheral conditions in order to take account of all axis restrictions.

The optimization with the division parameter as optimization parameter enables the actual requirement made in each case, for example hi respect of quality or throughput time, to be achieved as well as possible.

In accordance with at least one form of embodiment a throughput time for processing or measurement of a workpiece in accordance with the path is used as the target function for the optimization method.

In such forms of embodiment greater dimensional tolerances can be acceptable for example than would be the case for the universal robust design of a machine tool. For example a higher degree of overshoot of the axes can be accepted in order to achieve the objective of the smallest possible throughput time.

In accordance with at least one form of embodiment a characteristic variable for an accuracy for processing or measuring the workpiece in accordance with the path is used as a target function for the optimization method.

In such forms of embodiment the focus is not necessarily on the minimization of the throughput time for example, but on an exact as possible movement of the axes in accordance with the path. This can for example be of greater importance in a measurement of the workpiece or with higher requirements for dimensional compliance or for very small tolerances for production of the workpiece.

In accordance with at least one form of embodiment a characteristic value for a surface quality for processing of the workpiece in accordance with the path is used as the target function for the optimization function.

The surface quality can for example be optimized by moving the axes as evenly as possible without abrupt changes of direction and such like.

The improved concept thus enables the machine tool to be operated in the optimum manner according to the actual requirements.

The different target functions in this case can also be combined for different areas of the workpiece or for different sections of the path, so that for example, in a first area of the workpiece, the emphasis is on a throughput time that is as small as possible, for another area however it is on the highest possible accuracy or surface quality.

In accordance with at least one form of embodiment a third maximum value for a third kinematic parameter relating to the advancing movement along the section dependent on the geometric description is ascertained by means of the control unit. The planning of the advancing movement along the section is carried out taking into account the third maximum value.

In accordance with at least one form of embodiment the third maximum value is given by a maximum path jerk of the advancing movement. The path jerk is in this case in particular given by $d^3s/dt^3$.

As stated for the axis accelerations above, a fixed maximum axis jerk can also be specified in each case for the axes of the machine tool. Through the kinematic relationship between axis jerk on the one hand and path acceleration, path velocity and path jerk on the other hand, the corresponding restrictions are also produced for path velocity, path acceleration and path jerk through the restriction of the axis jerk. Here too through two further division parameters, which can also be referred to as CEOPJ and CEOPAJ (curve effect on path jerk or curve effect on path acceleration jerk), a division of the available maximum axis jerk to the individual terms can effectively be undertaken, these are then given for example by a first term, which is proportional to the third power of the path velocity, a second term, which is proportional to a product of path velocity and path acceleration, and a third term, which is proportional to the path jerk.

The restrictions produced by this for example for path velocity, path acceleration and path jerk can also be taken into account as further peripheral conditions for the above determinations of the first or second maximum value for the first or second kinematic parameter.

The corresponding individual ascertaining of the third maximum value or the individual restriction of the third kinematic parameter dependent on the geometric description enables the parametrization of the controller to be further individualized and optimized.

In accordance with the improved concept a control system for an at least two-axis machine tool is specified, wherein the control system has a control unit or consists of the control unit. The control unit is configured to actuate the machine tool for carrying out an advancing movement through simultaneous movement, at least in sections, of a first axis and a second axis of the machine tool in accordance with a path defined by a predetermined geometric description. The control unit is configured to ascertain a first maximum value for a first kinematic parameter relating to the advancing movement along a section of the path dependent on the geometric description and to plan the advancing movement along the section while taking into account the first maximum value. The control unit is configured to actuate the first axis and the second axis for carrying out the advancing movement in accordance with the planned movement along the section.

Further forms of embodiment of the control system according to the improved concept follow directly from the various forms of embodiment of the method according to the improved concept and vice versa. In particular a control system according to the improved concept can be configured or programmed to carry out a method according to the improved concept or the control system carries out such a method.

In accordance with the improved concept a machine tool is also specified, which is designed with at least two axes and contains a control system according to the improved concept.

In accordance with the improved concept a computer program with commands is also specified, wherein the commands, on execution of the commands or the computer program by a control system according to the improved concept, in particular by the control unit of the control system, cause the control system to carry out a method according to the improved concept and/or on execution by a machine tool according to the improved concept, in particular the control unit of the control system of the machine tool, cause the machine tool to carry out a method according to the improved concept.

In accordance with the improved concept a computer-readable storage medium is also specified, which stores a computer program according to the improved concept.

BRIEF DESCRIPTION OF THE DRAWING

The invention will be explained in greater detail below with the aid of actual exemplary embodiments and associated schematic drawings. It is hereby shown in FIGURE a schematic diagram of an example of a form of embodiment of a machine tool according to the improved concept.

DETAILED DESCRIPTION OF PREFERRED EMBODIMENTS

Shown schematically in the FIGURE is an example of a form of embodiment of a machine tool 1 according to the improved concept, which is configured to be able to move a tool 3 relative to a workpiece 4 along at least two linear axes, in the present example three linear axes X1, X2, X3 are shown. The advancing movement can be undertaken in this case by movement of the tool 3 with a fixed-location workplace 4 or vice versa. The diagram of the machine tool 1 in the FIGURE is to be understood as purely schematic and by way of example and in particular does not restrict the improved concept with regard to the type of the machine tool or the type of the advancing movements.

The machine tool 1 moreover has a control unit 2, which represents a control system according to the improved concept.

The maximum realizable path velocity $v_B$ at the machine tool 1 is restricted by the axial dynamic restrictions. Dynamic restrictions of an axis i can for example be maximum axis velocity $v_{i,max}$, maximum axis acceleration $a_{i,max}$ and maximum axis jerk $j_{i,max}$. The axis velocity is given by $v_i = dx_i/dt$, the acceleration by $a_i = d^2x_i/dt^2$ and the axis jerk by $j_i = d^3x_i/dt^3$ wherein $x_i$ designates the coordinate corresponding to axis i or the degree of freedom corresponding to the axis i. With $\lambda_i=dx_i/ds$, $k_i=d^2x_i/ds^2$ and $m_i=d^3x_i/ds^3$ the following then applies $$v_i=\lambda_i * v_B \tag{1}$$

$$a_i=k_i * v_B^2 + \lambda_i * a_B \text{ and} \tag{2}$$

$$j_i=m_i * v_B^3 + 3 * k_i * v_B * a_B \cdot \lambda_i * j_B. \tag{3}$$

The axis velocities $v_i$ have a direct influence on the path velocity $v_B$. Equation (1) represents a linear relationship between the axis velocity $v_i$ and path velocity $v_B$. With knowledge of the maximum allowed axis velocities $v_{i,max}$, this first maximum realizable path velocity $v_B$ can be determined from equation (1).

By contrast with this the relationship from equation (2) is not linear and cannot be easily resolved. The maximum axis acceleration $a_i$ must optimally be distributed between the two terms on the right-hand side of equation (2), which can be referred to a centripetal term and path acceleration term. This division can be realized with the aid of division parameters $CEOPA_i$ with $0 \leq CEOPA_i \leq 1$, which to certain extent reserves a part of the maximum axis acceleration $a_{i,max}$ for the centripetal term:

$$CEOPA_i * a_{i,max} := k_i * v_{B,max}^2 \tag{4}$$

so that the maximum path velocity $v_{B,max}$ is given by:

$$v_{B,max} = (CEOPA_i * a_{i,max}/k_i)^{1/2}. \tag{5}$$

Thus the following is produced for the path acceleration term $$(1-CEOPA_i) * a_{i,max} = \lambda_i * a_{B,max} \tag{6}$$

or $$a_{B,max} = (1-CEOPA_i) * a_{i,max}/\lambda_i \tag{7}$$

With knowledge of the maximum axis acceleration $a_{i,max}$ and the factor $CEOPA_i$, with the aid of the equations (5) and (7), a further maximum realizable path velocity $v_{B,max}$ and a maximum realizable path acceleration $a_{B,max}$ can be determined, wherein the restriction by equation (1) is to be taken in account where necessary.

Stored on a memory unit of the control unit 2 is a parts program, which contains a geometric description of a path along which the advancing movement is to be carried out. The control unit 2 can plan the advancing movement for the individual sections or for all sections of the path based on the predetermined geometric description.

To this end the control unit 2 can for example determine the maximum path velocity $v_{B,max}$ and plan the advancing movement along the section, taking into account the maximum path velocity $v_{B,max}$, i.e. plan it in such a way that the amount of the actual path velocity $v_B$ along the section does not fall below the maximum or programmed path velocity $v_{B,max}$.

In order to ascertain the maximum path velocity $v_{B,max}$, the control unit 2 in particular ascertains the values for $CEOPA_i$. In this case it is to be noted that the relationship (5) applies for all axes of the machine tool 1. The ascertaining of the maximum path velocity $v_{B,max}$ is therefore undertaken in particular while taking account of all corresponding relationships, for example as minimum value of the corresponding possible values for the maximum path velocity $v_{B,max}$.

Through the ascertaining of $CEOPA_i$ via the equation (7) the maximum path acceleration $a_{B,max}$ can also be ascertained, wherein here too the corresponding relationships for all axes are taken into account.

The choice of $CEOPA_i$ can be made differently in this case for different classes of workpiece or for each actual workpiece 4 and where necessary also be changed dynamically for different sections of a path during the processing or measurement of a single workpiece 4.

The larger the values ascertained for CEOPA are in this case, the more the focus lies on the achievement of as high a path velocity or centripetal acceleration as possible at the expense of the available maximum path acceleration and vice versa. For example with small path curves rather large $CEOPA_i$ i.e. in particular larger than 0.5, can be chosen. With greater curves within the same workpiece 4 or with other components or classes of component, a smaller value for $CEOPA_i$ can be chosen for example, in particular a value of approximately 0.5, in order in this way to achieve a symmetrical division between centripetal acceleration and path acceleration.

A similar division of the maximum axis jerk $j_{i,max}$ can be undertaken starting from equation (3). Two further division parameters $CEOPJ_i$ and $CEOPJ_i$ are required for this:

$$CEOPAJ_i * j_{i,max} := m_i * v_{B,max}^3, \tag{8}$$

$$CEOPJ_i * (1-CEOPAJ_i) * j_{i,max} := 3 * k_i * v_{B,max} * a_{B,max}, \tag{9}$$

so that it follows that $$[1-CEOPJ_i * (1-CEOPAJ_i)] * j_{i,max} = \lambda_i * j_{B,max}, \tag{10}$$

or $$j_{B,max} = [1-CEOPJ_i * (1-CEOPAJ_i)] * j_{i,max}/\lambda_i, \tag{11}$$

As stated above for $CEOPA_i$ the division parameters $CEOPAJ_i$ and $CEOPJ_i$ can also be adapted and optimized according to actual requirements.

In different forms of embodiment, when the processing or measurement of workpieces 4 is being carried out by the machine tool 1 corresponding real time parameters are also stored for each pass. The real time parameters or real time data can be taken into account during later passes. For the processing of identical workpieces 4, in this way the computing steps necessary for optimization or ascertaining of the division parameters can be saved where necessary in this case. As an alternative or in addition there can also be an iterative adaptation of the division parameters, in order in this way to obtain an optimum result step-by-step.

As described, the improved concept makes it possible to control a machine tool with at least two axes in particular individually and to parameterize it optimally, so that compromises, as are to be made with universally parameterizable controllers, can be avoided and in this way overall, depending on the actual requirement, a reduced throughput time and/or an increased production or measurement quality can be achieved.

In corresponding developments the improved concept can also be used accordingly for the combination of other relevant parameters for pan-axis precision or for regulation of drives.

What is claimed is:

1. A method for operating of a machine tool having at least two axes, comprising:
predetermining a geometric description of a path and performing an advancing movement in accordance with the path by simultaneously moving at least sectionally a first axis and a second axis of the machine tool;

with a control unit of the machine tool
setting a first maximum value for a first kinematic parameter relating to the advancing movement along a section of the path dependent on the geometric description;
planning the advancing movement along the section with the control unit by taking into account the first maximum value;
activating the first axis and the second axis for executing the advancing movement in accordance with the planned movement along the section;
setting a second maximum value for a second kinematic parameter relating to the advancing movement along the section of the path dependent on the geometric description;
planning of the advancing movement along the section by taking account of the second maximum value;
determining a range of values for the first maximum value depending on a predetermined first kinematic limit value for the first axis;
determining a first range of values for the second maximum value depending on the first kinematic limit value for the first axis; and
for setting the first maximum value and the second maximum value, determining—dependent on the geometric description—a division parameter, which is used to uniquely define both the first maximum value and the second maximum value within the first range of values.

2. The method of claim 1, further comprising defining the first maximum value by a maximum path velocity of the advancing movement.

3. The method of claim 1, further comprising:
determining the division parameter with an optimization method executed by the control unit, and
using the division parameter as an optimization parameter.

4. The method of claim 3, further comprising using as a target function for the optimization method a throughput time for processing or measuring a workpiece in accordance with the path.

5. The method of claim 3, further comprising using as a target function for the optimization method a characteristic variable for an accuracy for processing or measuring a workpiece in accordance with the path.

6. The method of claim 5, further comprising using as a target function for the optimization method a characteristic variable for a surface quality for processing the workpiece in accordance with the path.

7. The method of claim 1, wherein the second maximum value is defined by a maximum path acceleration of the advancing movement.

8. The method of claim 1, further comprising:
setting a third maximum value for a third kinematic parameter relating to the advancing movement along the section depending on the geometric description; and
planning the advancing movement along the section by taking into account the third maximum value.

9. The method of claim 8, wherein the third maximum value is defined by a maximum path jerk of the advancing movement.

10. A non-transitory computer-readable storage medium storing a computer program comprising commands, which when loaded into a memory of a control system controlling a machine tool having at least two axes and executed by a processor of the control system, causes the control system to carry out a method as set forth in claim 5.

11. A control system for a machine tool having at least two axes, said control system comprising:
a control unit configured to control the machine tool for executing an advancing movement by simultaneously moving at least sectionally a first axis and a second axis of the machine tool in accordance with a path defined by a predetermined geometric description, wherein the control unit is further configured to
set a first maximum value for a first kinematic parameter relating to the advancing movement along a section of the path dependent on the geometric description;
plan the advancing movement along the section by taking into account the first maximum value;
activate the first axis and the second axis for executing the advancing movement in accordance with the planned movement along the section;
set a second maximum value for a second kinematic parameter relating to the advancing movement along the section of the path dependent on the geometric description;
plan of the advancing movement along the section by taking account of the second maximum value;
determine a range of values for the first maximum value depending on a predetermined first kinematic limit value for the first axis;
determine a first range of values for the second maximum value depending on the first kinematic limit value for the first axis; and
for setting the first maximum value and the second maximum value, determine—dependent on the geometric description—a division parameter, which is used to uniquely define both the first maximum value and the second maximum value within the first range of values.

12. A machine tool having at least two axes and comprising a control system as set forth in claim 11.

* * * * *